(12) United States Patent
Merten et al.

(10) Patent No.: US 8,636,297 B2
(45) Date of Patent: Jan. 28, 2014

(54) HITCH

(75) Inventors: David J. Merten, Manitowoc, WI (US); Jay Z. Muchin, Manitowoc, WI (US); Michael M. Potempa, Freeport, IL (US); Brian S. Potempa, Freeport, IL (US)

(73) Assignee: M Group, Inc., Manitowoc, WI (US)

( * ) Notice: Subject to any disclaimer, the term of this patent is extended or adjusted under 35 U.S.C. 154(b) by 651 days.

(21) Appl. No.: 12/723,637

(22) Filed: Mar. 13, 2010

(65) Prior Publication Data
US 2011/0221167 A1 Sep. 15, 2011

(51) Int. Cl.
*B60D 1/07* (2006.01)

(52) U.S. Cl.
CPC ........................................ *B60D 1/07* (2013.01)
USPC ............ 280/504; 280/480; 280/511; 280/515

(58) Field of Classification Search
USPC ........................ 280/480, 491.5, 504, 511, 515
See application file for complete search history.

(56) References Cited

U.S. PATENT DOCUMENTS

| | | | | |
|---|---|---|---|---|
| 2,531,559 A * | 11/1950 | Deviley | ........................ | 280/495 |
| 2,911,233 A * | 11/1959 | Riddle | ........................ | 280/416.1 |
| 3,326,576 A * | 6/1967 | Kothmann | ........................ | 280/515 |
| 3,490,790 A * | 1/1970 | Kees | ........................ | 280/508 |
| 3,843,160 A * | 10/1974 | Frushour et al. | ........................ | 280/416.1 |
| 3,963,264 A | 6/1976 | Down | | |
| 4,426,097 A | 1/1984 | Livingston | | |
| 4,613,149 A * | 9/1986 | Williams, Jr. | ........................ | 280/508 |
| 4,697,818 A | 10/1987 | Moore | | |
| 4,792,151 A * | 12/1988 | Feld | ........................ | 280/406.2 |
| 5,106,114 A | 4/1992 | Haupt | | |
| 5,131,491 A * | 7/1992 | Varner et al. | ........................ | 182/7 |
| 5,342,076 A * | 8/1994 | Swindall | ........................ | 280/479.2 |
| 5,562,298 A * | 10/1996 | Kass et al. | ........................ | 280/406.2 |
| 5,702,118 A | 12/1997 | Hanson | | |
| 5,857,693 A * | 1/1999 | Clark, Jr. | ........................ | 280/415.1 |
| 5,873,594 A * | 2/1999 | McCoy et al. | ........................ | 280/491.5 |
| 5,890,727 A | 4/1999 | May | | |
| 6,116,633 A * | 9/2000 | Pride | ........................ | 280/511 |
| 6,357,780 B1 * | 3/2002 | Young | ........................ | 280/506 |
| 6,536,794 B2 | 3/2003 | Hancock | | |
| 6,764,092 B1 * | 7/2004 | Greaves, Jr. | ........................ | 280/494 |
| 6,837,510 B1 | 1/2005 | Karls | | |
| 6,851,698 B2 * | 2/2005 | Ingles | ........................ | 280/509 |
| D618,142 S * | 6/2010 | Hancock et al. | ........................ | D12/162 |
| 7,862,066 B2 * | 1/2011 | Smith | ........................ | 280/416.1 |
| 8,371,603 B2 * | 2/2013 | Columbia | ........................ | 280/511 |
| 2004/0219003 A1 * | 11/2004 | Bik et al. | ........................ | 414/462 |
| 2005/0001408 A1 * | 1/2005 | Irgens et al. | ........................ | 280/511 |
| 2005/0015945 A1 * | 1/2005 | Jensen et al. | ........................ | 24/599.6 |
| 2006/0061063 A1 * | 3/2006 | Lopez | ........................ | 280/504 |
| 2006/0214391 A1 * | 9/2006 | Columbia | ........................ | 280/491.5 |
| 2008/0315554 A1 * | 12/2008 | Rightmire | ........................ | 280/400 |
| 2009/0008186 A1 * | 1/2009 | Taylor et al. | ........................ | 182/48 |
| 2009/0039619 A1 * | 2/2009 | Gries | ........................ | 280/511 |
| 2009/0079164 A1 * | 3/2009 | Columbia | ........................ | 280/511 |
| 2009/0127820 A1 * | 5/2009 | Konsela | ........................ | 280/416.1 |
| 2010/0007116 A1 * | 1/2010 | Columbia | ........................ | 280/511 |

* cited by examiner

*Primary Examiner* — Anne Marie Boehler
*Assistant Examiner* — Maurice Williams
(74) *Attorney, Agent, or Firm* — Rathe Lindenbaum LLP

(57) ABSTRACT

A hitch includes a vertically extending trunk portion, a first limb horizontally extending from the trunk portion and a second limb horizontally extending from the trunk portion below the first limb.

31 Claims, 15 Drawing Sheets

HITCH

BACKGROUND

Hitches are sometimes used to connect implements to vehicles. Existing hitches may be space consuming, may lack functionality and may be difficult to use.

DETAILED DESCRIPTION OF THE EXAMPLE EMBODIMENTS

FIGS. 1-5 illustrate hitch 20 according to an example embodiment. Hitch 20 facilitates connection of various implements or loads to a vehicle. Examples of implements include, but are not limited to, carts, wagons, rakes, dethatchers, aerators and various other implements pulled or pushed by a vehicle. In addition, various loads may be pulled using hitch 20. Examples of vehicles that may utilize hitch 20 include, but are not limited to, lawnmowers, all-terrain vehicles, cars, trucks, tractors, skid steers, and the like. As will be described hereafter, hitch 20 provides multiple modes of connecting an implement or load to a vehicle in a compact and easier to use fashion.

Figure 6:
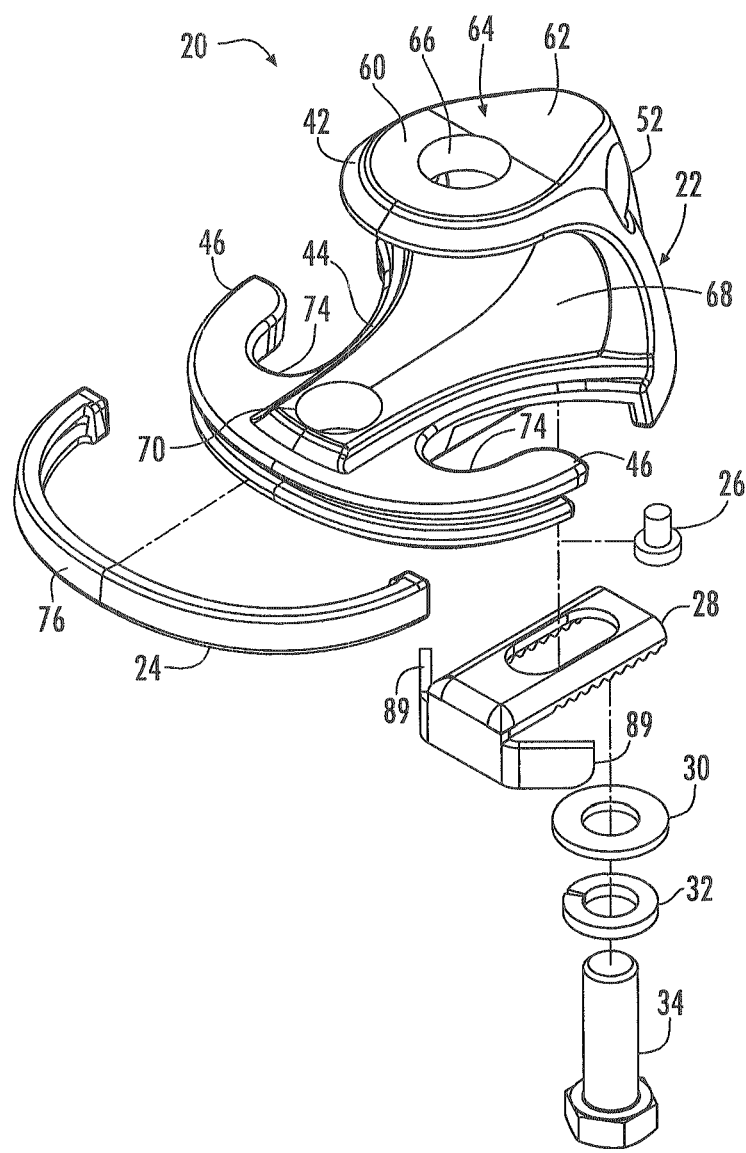
FIG. 6 is a top exploded perspective view of the hitch of FIG. 1.
Figure 7:
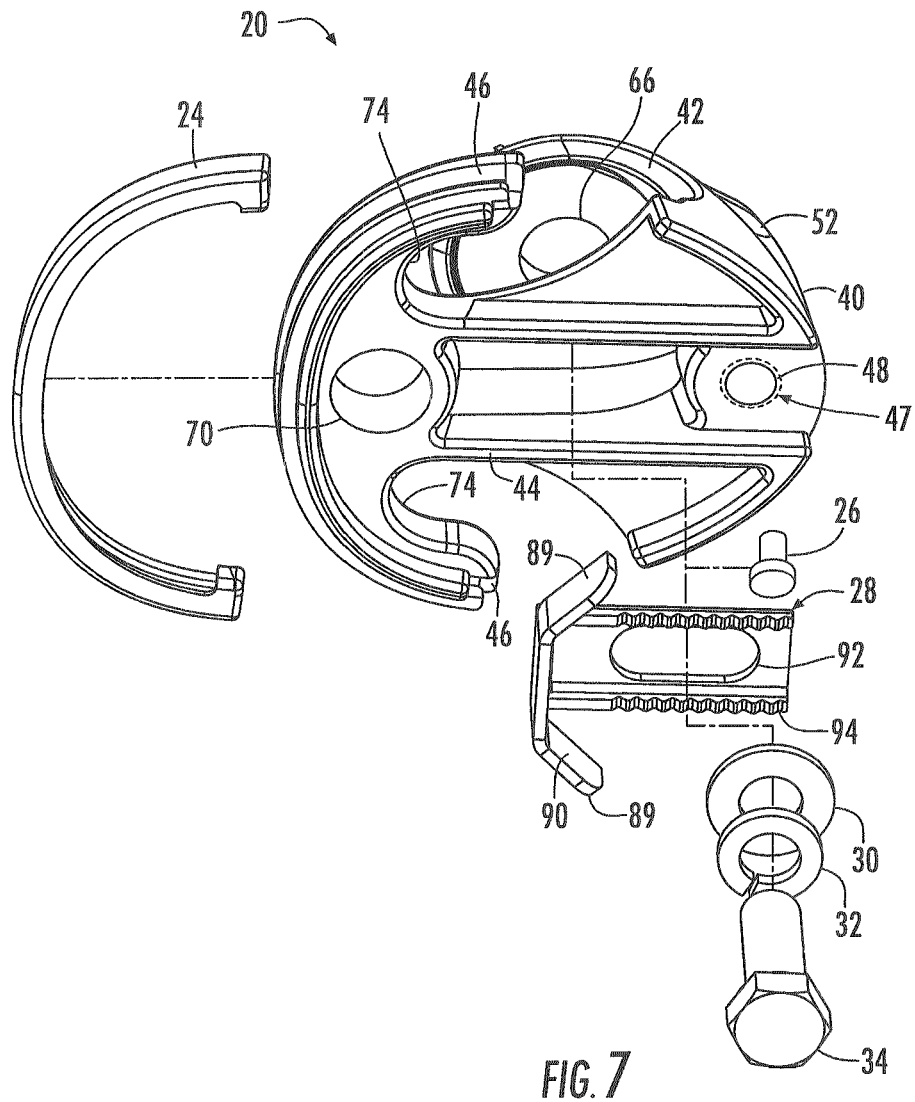
FIG. 7 is a bottom exploded perspective view of the hitch of FIG. 1.
Figure 8:
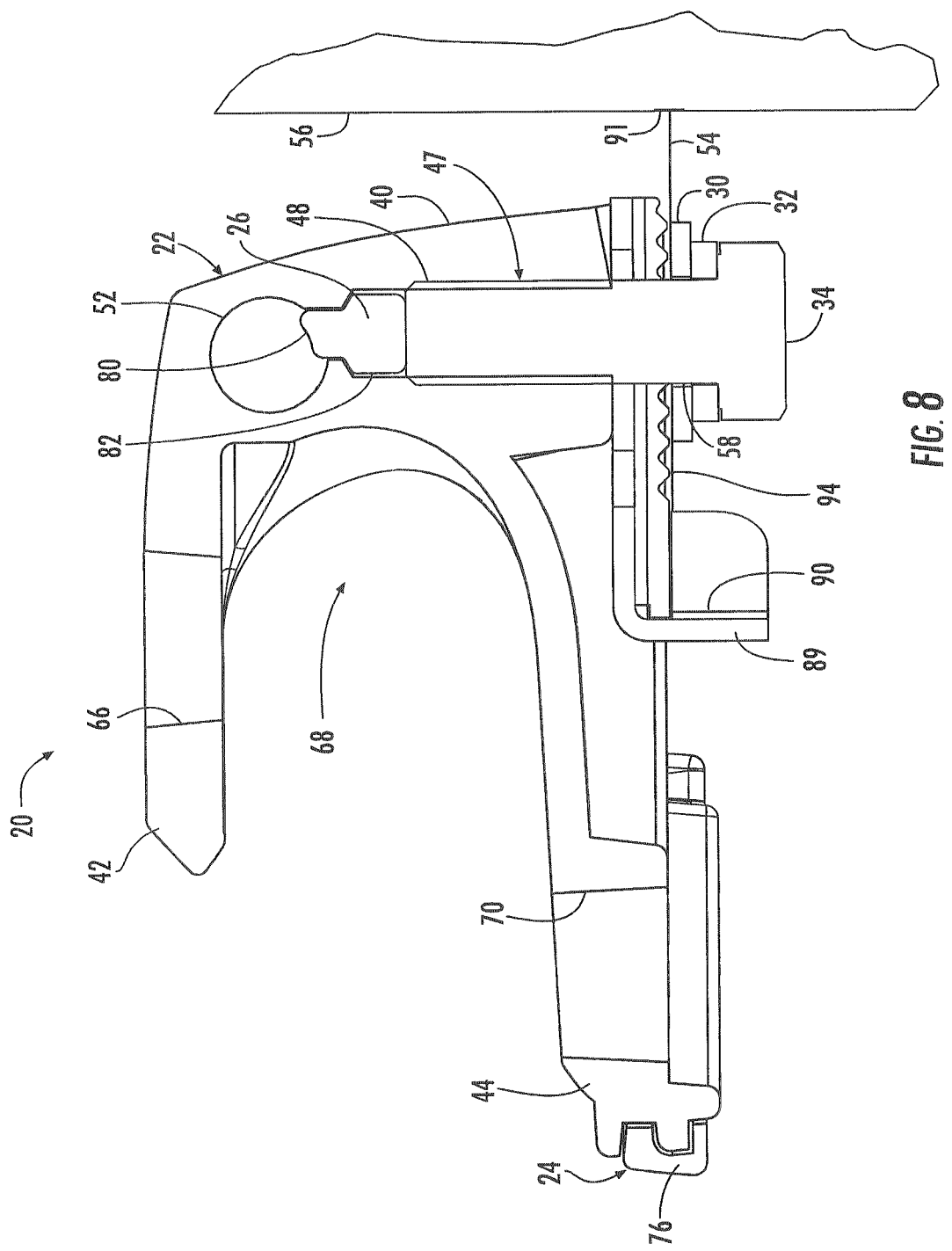
FIG. 8 is a sectional view of the hitch of FIG. 1 mounted to a vehicle.

FIGS. 6 and 7 are exploded perspective views of hitch 20. As shown by FIGS. 6 and 7, hitch 20 includes body 22, bumper 24, pin gripper 26, anti-rotation member 28, washers 30, 32 and fastener 34. Body 22 comprises one or more structures which form or provide trunk 40, limb 42, limb 44 and hooks 46. Trunk 40 comprises a generally vertically extending portion interconnecting, supporting and extending vertically between limbs 42 and 44. As shown by FIGS. 7 and 8, trunk 40 includes a vertically extending hitch mounting structure 47 and opening 52. Hitch mounting structure 47 is configured to be aligned with a vertical pin hole 58 of a mounting portion 54 of a vehicle 56 to facilitate mounting of the hitch 20 to a mounting structure such as a hitch plate or tongue 54 of a vehicle 56. In the example illustrated, hitch mounting structure 47 comprises a bore 48. Bore 48 vertically extends into trunk 40 from a lower face or side of trunk 40. Bore 48 is configured to receive fastener 34. As shown by FIG. 8, bore 48 facilitates the connection of fastener 34 to hitch 20 while hitch 20 is connected to a tongue 54 of a vehicle 56. In particular, bore 48 receives fastener 34 while fastener 34 extends through an opening 58 in tongue 54.

In the example illustrated, bore 48 comprises an internally threaded closed or blind opening or bore. In the example illustrated, bore 48 is closed at its innermost end by pin gripper 26. In other embodiments, bore 48 may be closed at its innermost end by body 22. Because bore 48 is blind or closed, moisture and other contaminants are less likely to infiltrate bore 48, potentially reducing corrosion or rust and facilitating easier subsequent removal of hitch 20 from tongue 54. In yet other embodiments, bore 48 may be open at both ends.

In other embodiments, vertically extending mounting structure 47 may have other configurations. For example, in other embodiments, in lieu of comprising a vertically extending bore 48 which is aligned with pinhole 58, mounting structure 47 may alternatively comprise a downwardly extending projection, protuberance, shaft or pin aligned with pin hole 58 so as to project into and through pin hole 48. In one embodiment, the downwardly projecting shaft or pin may have external threads so as to threadably engage a threaded nut on an opposite side of tongue 54 to mount hitch 20 to tongue 54. In one embodiment, the downwardly projecting shaft or pin may be integrally formed as a single unitary body with trunk 40. In other embodiments, the downwardly projecting shaft or pin may be welded, bonded or otherwise secured to trunk 40. In yet other embodiments, in which trunk 40 is secured to tongue 54 or other portions of vehicle 56 in other manners or is integrally formed as part of tongue 54 or as part of vehicle 56, bore 48 may be omitted.

Figure 1:
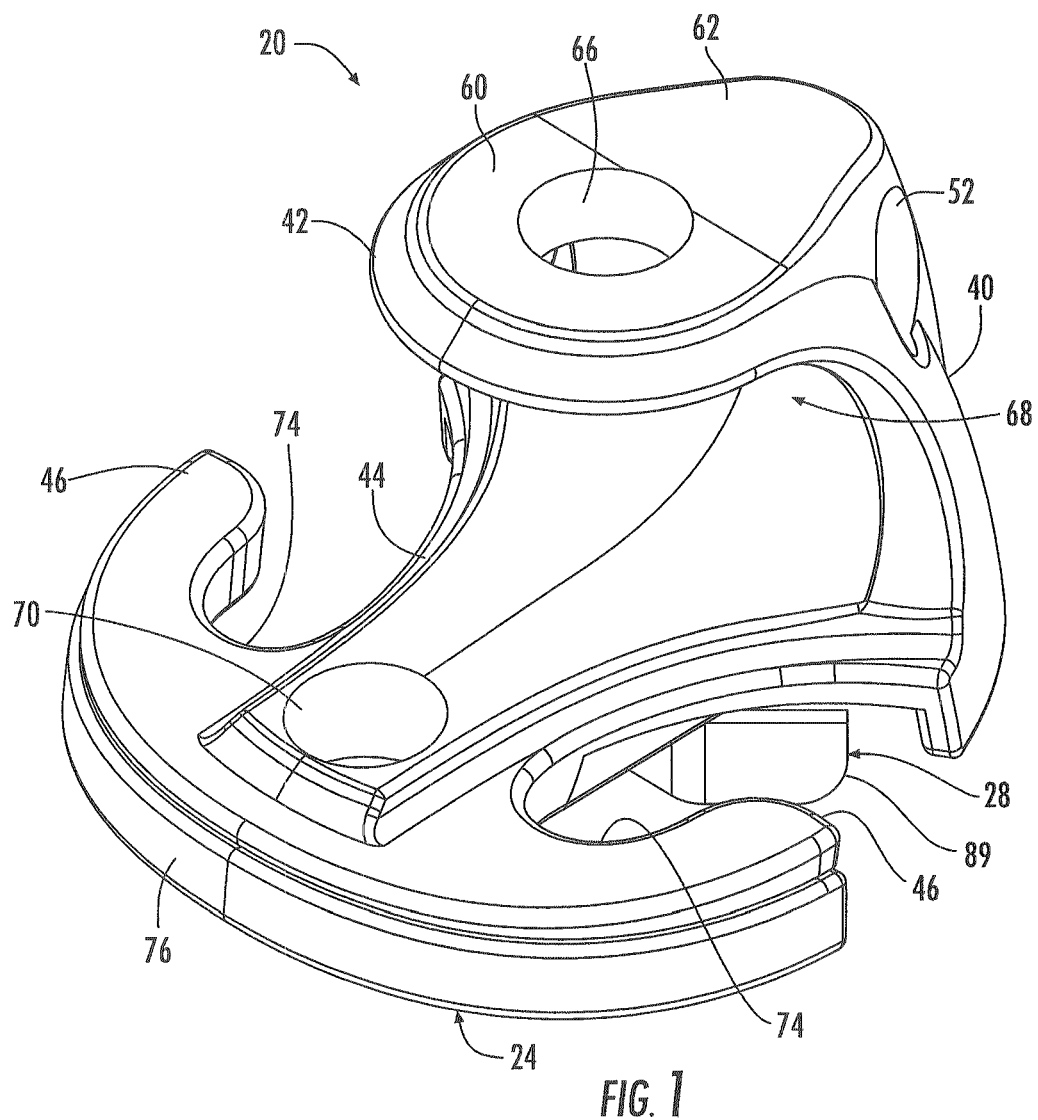
FIG. 1 is a top perspective view of a hitch according to an example embodiment.
Figure 2:
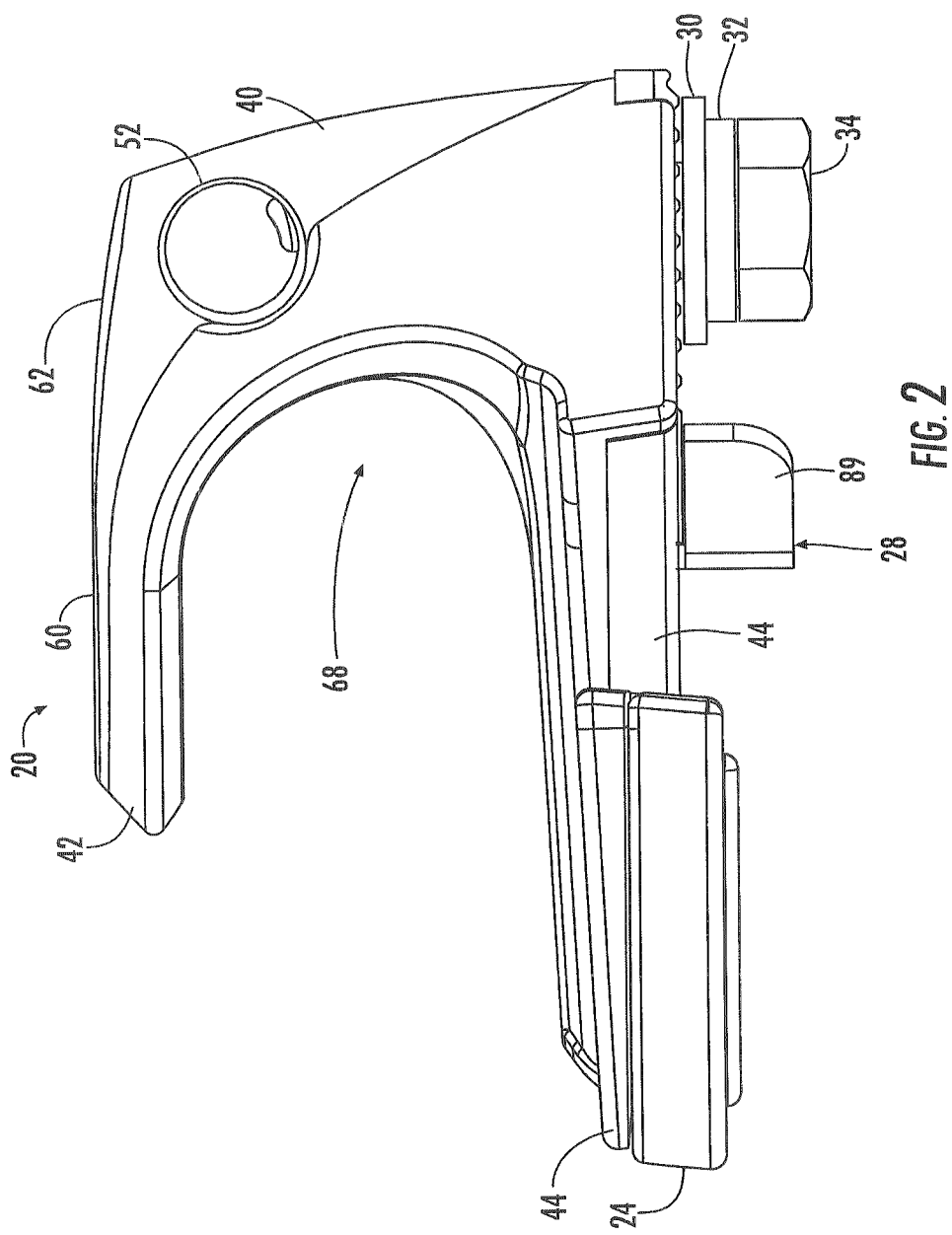
FIG. 2 is a right side elevational view of the hitch of FIG. 1, the left side elevational view being a mirror image of the right side elevational view shown.
Figure 3:
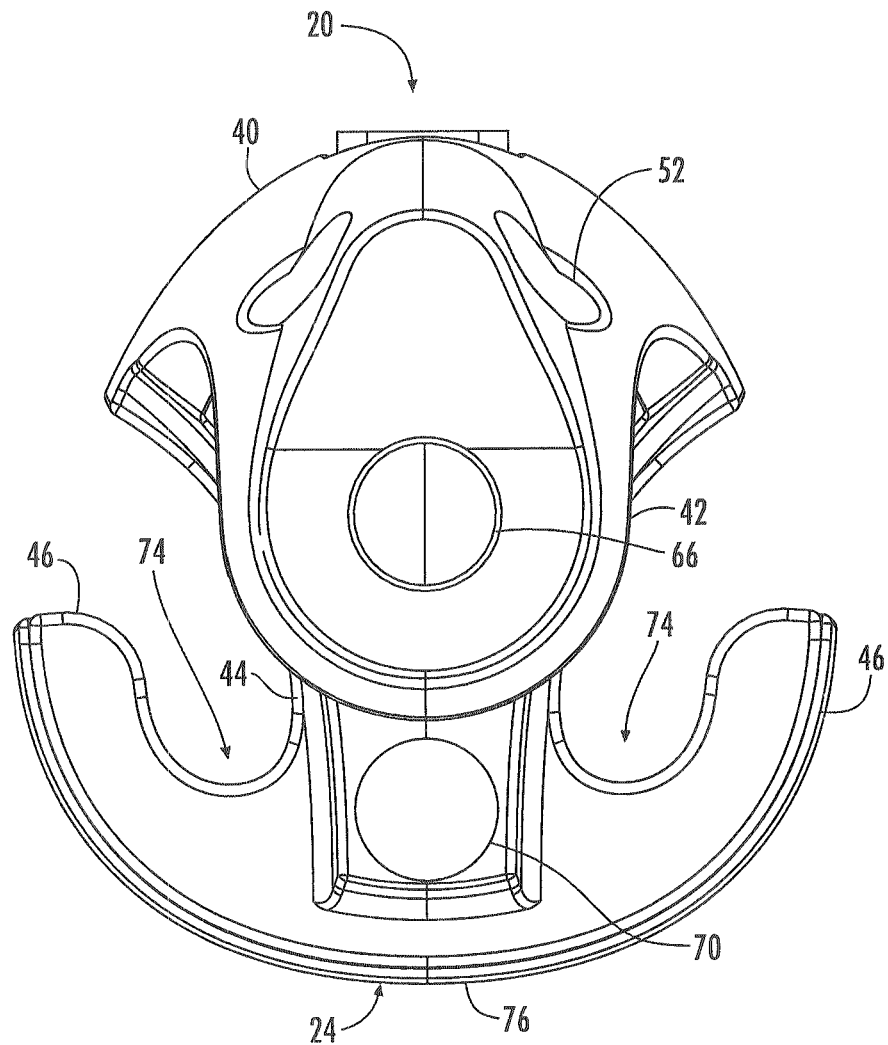
FIG. 3 is a top plan view of the hitch of FIG. 1.
Figure 4:
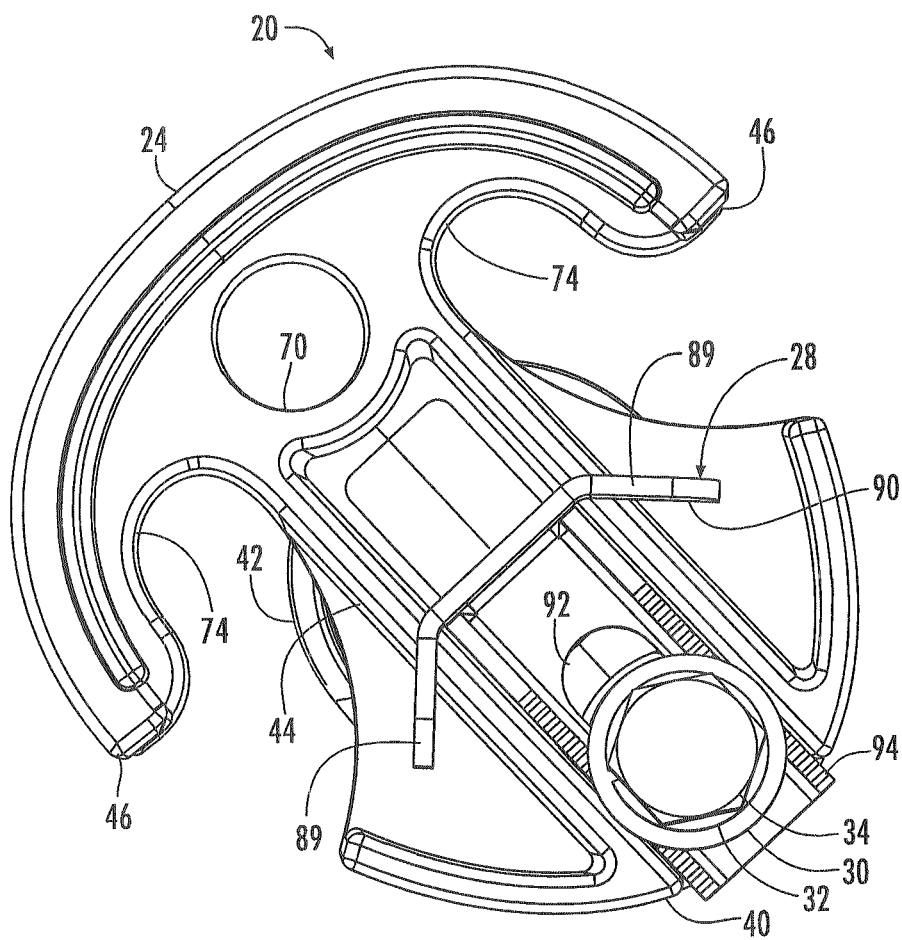
FIG. 4 is a bottom plan view of the hitch of FIG. 1.
Figure 5:
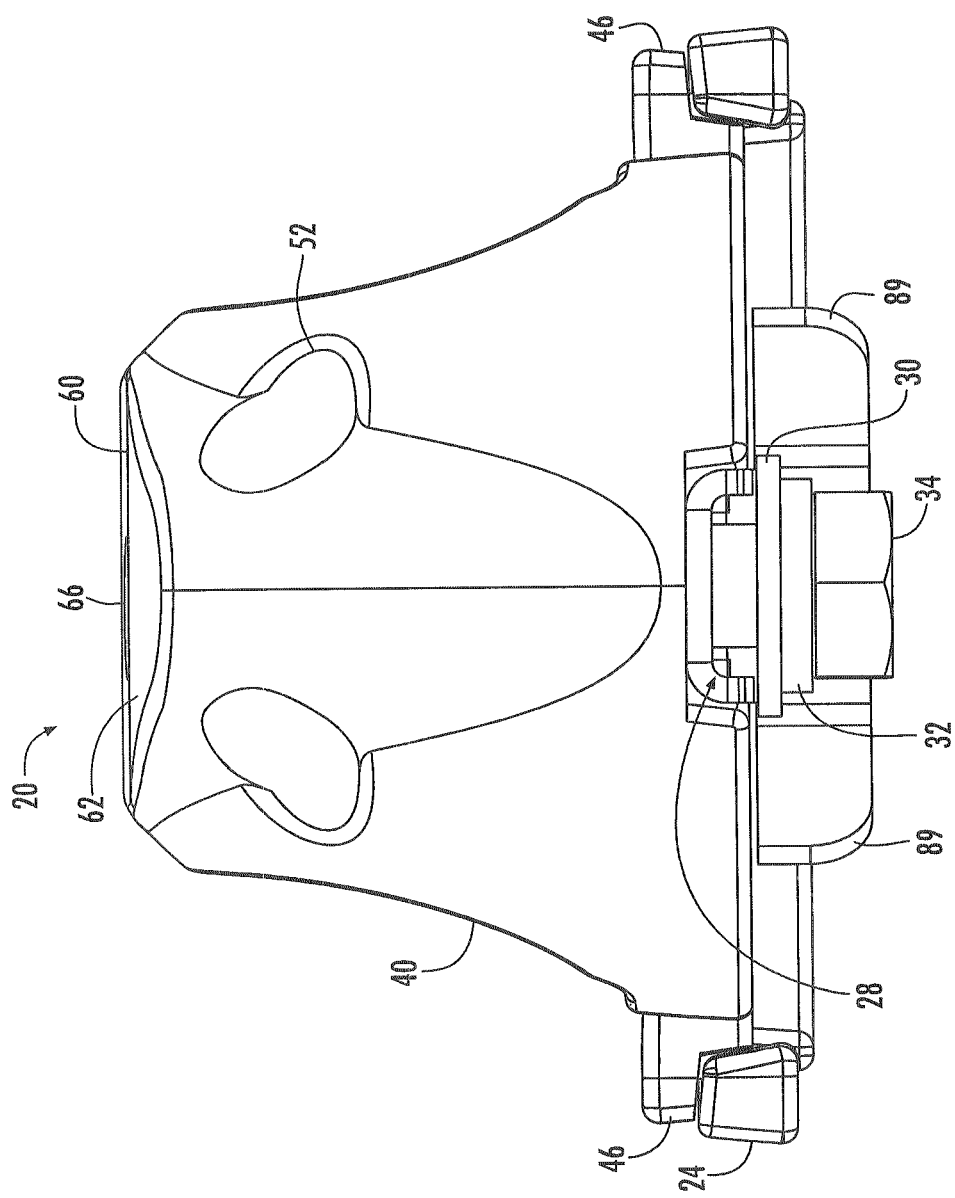
FIG. 5 is a rear elevational view of the hitch of FIG. 1.

As shown by FIGS. 2 and 8, opening 52 comprises a bore, channel or passage extending through trunk 40. Opening 52 is configured to receive a pin that is to be used to connect an implement or other load to vehicle 56 using limb 44. In the example illustrated, opening 52 has a diameter substantially equal to or just slightly larger than a diameter of the pin. Opening 42 extends through trunk 40 above limb 44 and largely below limb 42. Opening 52 is at a rear end of hitch 22. Opening 52 stores the pin when the pin is not in use. In the example illustrated, opening 52 extends substantially horizontally through trunk 40, substantially perpendicular to bore 48 and above bore 48. As a result, the stored pin extends proximate to vehicle 22 and is less likely to interfere with the use of other portions of hitch 20. In other embodiments, opening 52 may be omitted.

Limb 42 extends from trunk 40 above limb 44. Limb 42 has an upper surface 60 which cooperates with an upper surface 62 of trunk 42 form a platform 64 for receiving a ball hitch mount. Limb 42 further includes an opening 66 vertically extending through platform 64 28 volume 68 sandwiched between limb 42 and limb 44. Opening 66 is sized to receive the lower end of a ball hitch mount such as a lower threaded shaft extending from the ball of the ball hitch mount. Opening 66 is located such that volume 68 is sufficiently large to receive the nut and washer of the ball hitch mount, facilitating securement of the ball hitch mount to limb 42. Opening 66 facilitates connection of an implement using a ball hitch mount.

Limb 44 extends from trunk 40 below limb 42. Limb 44 is sufficiently vertically spaced from limb 42 so as to form the cavity or void 68, wherein the cavity or void 68 is large enough to receive the fastening components of the ball hitch mount. Limb 44 projects or extends beyond limb 42 and includes opening 70. Opening 70 extends through limb 44 beyond limb 42 by a sufficient distance such that the head of the pin may vertically pass limb 42 when being inserted through opening 70 such that the head rests upon limb 44. Opening 70 has an internal diameter sufficiently large to receive the pin. Opening 70 facilitates the connection of an implement using the pin.

Hooks 46 comprise catches or hooks extending from opposite transverse size of limb 44. Each of hooks 46 includes a notch 74 dimensioned to receive a rope, cord, chain or a hook or loop associated with the rope, cable or chain. Hooks 46 facilitates the connection of a load or implement to vehicle 56 such that the load or vehicle may be towed or pulled. Thus, hitch 20 provides a versatile hitch apparatus, allowing different implements or different loads to be connected to vehicle 56 in multiple different manners: by ball hitch, by pin or by chain, cable or rope.

Bumper 24 comprises one or more structures coupled to body 22 and extending at a end of most portion of body 22 beyond limb 42 and beyond limb 44. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members. The term "fluidly coupled" shall mean that two are more fluid transmitting volumes are connected directly to one another or are connected to one another by intermediate volumes or spaces such that fluid may flow from one volume into the other volume.

Bumper 24 serves as a surface that will first contact the implement or load when vehicle 56 is moved towards the implement or load, or vice versa. Bumper 24 is configured to reduce abrasion and damage to the implement or load in the case of inadvertent contact between hitch 20 and the implement or load. In the example illustrated, bumper 24 provides a smooth curved surface 76, less likely to scratch or damage structures inadvertently contacting hitch 20.

In one embodiment, hitch 24 is formed from a material different than that of body 22 such that bumper 24 is softer or more compressible as compared to body 22. In one embodiment, bumper 24 is formed from a soft or resiliently compressible material such as a polymeric material or a rubber-like material while body 22 is formed from a metal material. In the example illustrated, body 22 is formed from zinc plated cast carbon steel while bumper 24 is formed from rubber. In other embodiments, bumper 24 may have other shapes, may be formed from other materials or may be omitted.

Pin gripper 26 comprises one or more structures configured to secure and retain a pin stored within opening 52. In one embodiment, pin gripper 26 frictionally engages an outer surface of the pin. In other embodiments, pin gripper 26 may lock or fit within a corresponding detent formed in the pin. In the example illustrated, pin gripper 26 has a pin gripping surface 80 (shown in FIG. 8) formed from a material different than that of body 22 and that has a higher coefficient of friction with the material of the pin than that of the material of body 22. In one embodiment, surface 80 is resiliently biased into and toward a center of opening 52 to increase friction resistance used to retain the pin in opening 52. In one embodiment, pin gripper 26 may be formed from a rubber or rubber-like material resiliently biasing surface 80 into opening 52. In yet other embodiments, springs or other mechanisms may be used to resiliently bias surface 80 into opening 52. As a result, the pin may be more securely and reliably retained within opening 52. According to one embodiment, pin gripper 26 is formed from a polymeric material, such as polyvinyl chloride (PVC) having a higher coefficient of friction with a metal pin than that of the metal material of body 22.

As shown by FIG. 8, in the example illustrated, pin gripper 26 comprises a plug inserted through bore 50 into a plug receiving cavity 82. Pin gripper 26 closes off the end of bore 50. In the example illustrated, the extent to which pin gripper 26 extends into opening 56 and the force at which pin gripper 56 bears against and grips the pin may be adjusted by adjusting a faster 74 which locates pin gripper 26 with respect to opening 52. For example, if a pin is to be withdrawn from opening 52, a person may loosen faster 34, allowing pin gripper 26 to be further retracted out of opening 52 to loosen the grip upon the pin to be withdrawn. Alternatively, once a pin has been inserted into opening 52 for storage, faster 34 may be tightened down to force 10 gripper 26 into opening 52 by a greater extent or to urge surface 80 against the pin at a greater level of force to increase the amount of friction holding the pin in bore 52. The extent to which pin gripper 26 extends into opening 52 may also be adjusted through the use of fastener 34 to accommodate pins stored in opening 52 that have different shaft diameters. In some embodiments, additional, fewer washers or washers having different thicknesses may be employed to provide secure retention of hitch 20 to tongue 54 while the same time accommodating pins within opening 52 that have different shaft diameters.

Because pin gripper 26 may be inserted through bore 50, fabrication of body 22 and assembly of pin gripper 26 with respect to bore 52 may be simplified. Pin gripper 26 may also be more easily replaced such as when pin gripper 26 becomes worn, abraded or damaged. In other embodiments, pin gripper 26 may have shapes and may be supported or secured to body 22 in other fashions and at other locations. For example, pin gripper 26 may be molded into, bonded to, snapped into or otherwise secured in a detent along opening 52 at other locations. In still other embodiments, pin gripper 26 may be omitted.

Anti-rotation member 28 comprises a member joined to an underside of body 22 and configured to cooperate with tongue 54 or other portions of vehicle 56 to inhibit rotation of hitch 20 about the axis of fastener 34. In particular, anti-rotation member 28 provides struts 89 and an anti-rotation cavity 90 (shown in FIGS. 4, 7 and 8). Struts 89 abut an edge of tongue 54 to inhibit rotation of hitch 20. Cavity 90 receives a vehicle tongue, such as tongue 54 shown in FIG. 8 or receives an anti-rotational plate that abuts vehicle 56, such as a plate that abuts surface 91, so as to inhibit rotation of hitch 20 about the axis of fastener 34.

Figure 9:
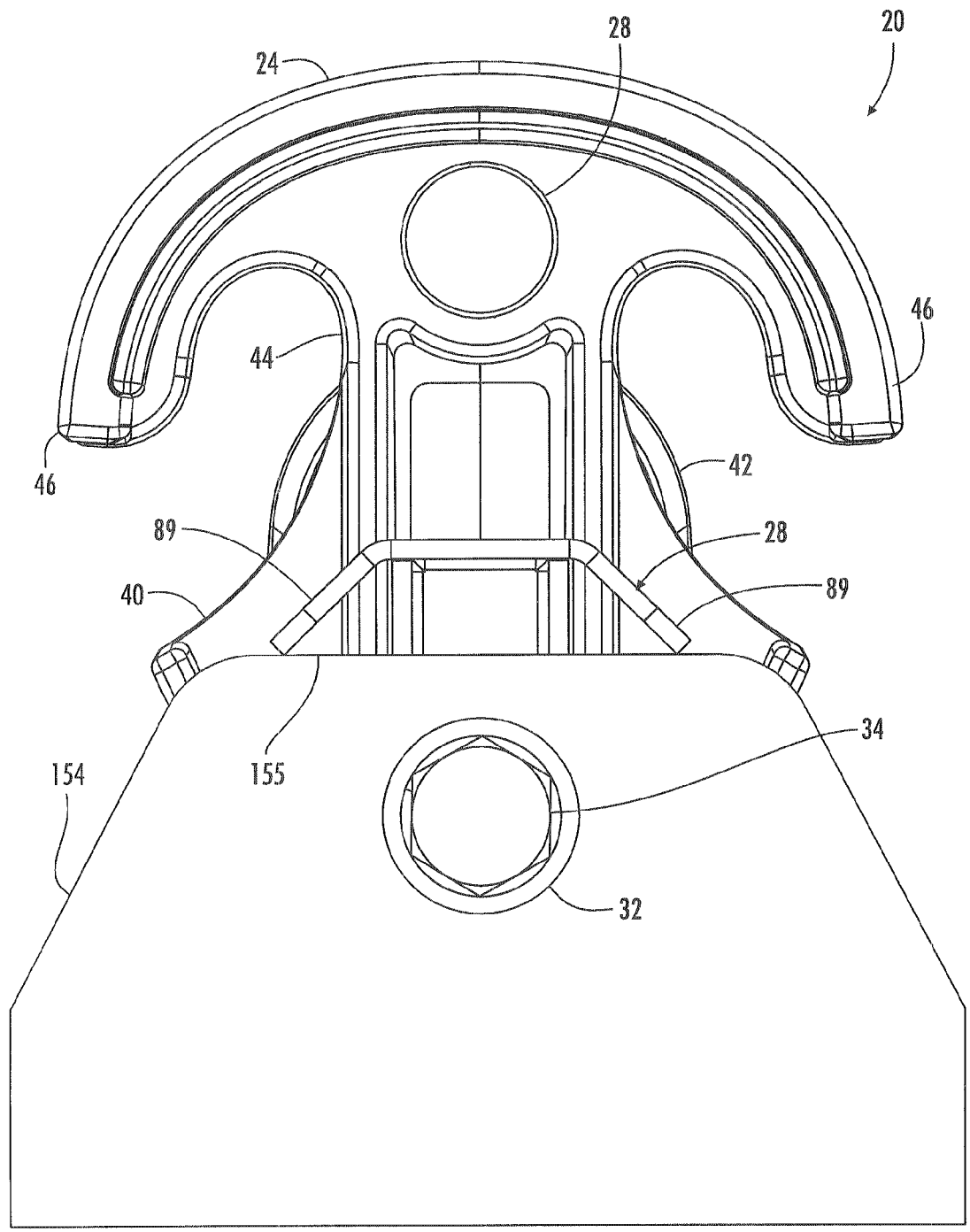
FIG. 9 is a bottom plan view of the hitch of FIG. 1 mounted to the vehicle.
Figure 10:
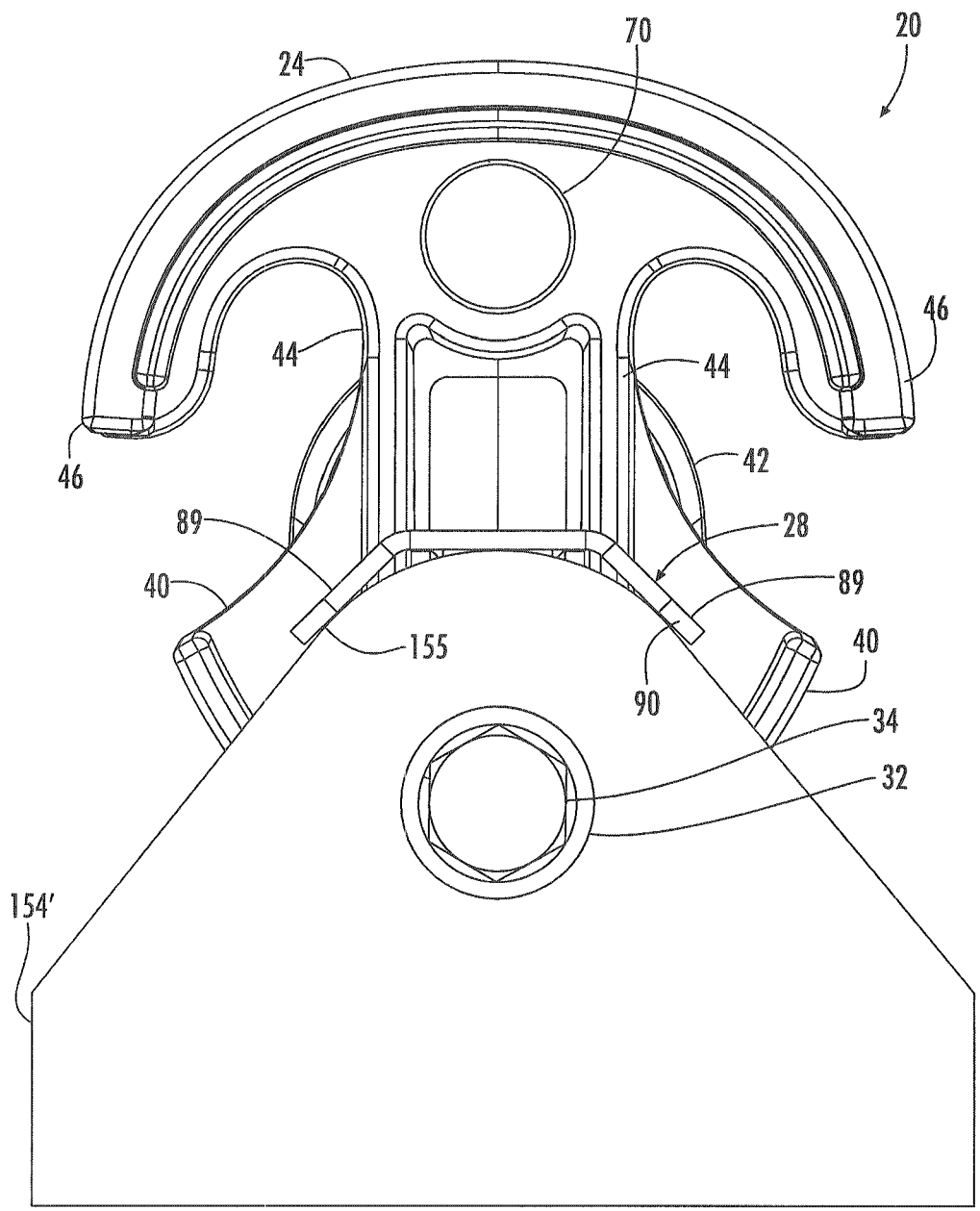
FIG. 10 is a bottom plan view of the hitch of FIG. 1 mounted to another vehicle.

As shown by FIGS. 9 and 10, anti-rotational member 28 is slidable or otherwise movable relative to body 22 to adjust the positioning of cavity 90 with respect to body 22. As a result, cavity 90 may be repositioned with respect to body 22 to locate cavity 90 against a tongue or against the anti-rotation plate. FIG. 9 illustrates member 28 translated into abutment with a tongue 154 having a straight edge portion 155. FIG. 9 illustrates member 28 moved and positioned against a tongue 154' having a narrowing or pointed end portion 155' which is received within cavity 90.

According to one embodiment, anti-rotation member 28 includes an elongate slot 92 through which fastener 34 extends as shown in FIG. 8. Consequently, anti-rotation member 28 may be repositioned and once appropriately positioned, fastener 34 may be tightened down to retain anti-rotation member 28 in place. Anti-rotation member 28 is secured using the same fastener 34 that is used to position or hold pin gripper 26 and that is also used to secure hitch 20 to tongue 54. In other embodiments, separate fasteners or mechanisms may be used to retain anti-rotation member 28 with respect to body 22.

To further inhibit movement of anti-rotation member 28 once positioned, number 28 additionally includes teeth 94 for gripping and upper surface of tongue 54. In other embodiments, anti-rotation member 28 may be movable in other fashions, may be fixed to or integrally formed as part of body 22 or may be omitted.

Washers 30, 32 and fastener 34 facilitate securement of hitch 22 to tongue 54 of vehicle 56. In the example illustrated, washer 30 comprises a carbon steel, zinc plated washer, washer 32 comprises a carbon steel, zinc plated lock washer and fastener 34 comprises a hardened carbon steel zinc plated hex bolt having external threads that threadably engage interior threads within bore 50. In other embodiments, other fasteners and other mechanisms may be used to secure hitch 22 to tongue 54 or to vehicle 56.

Figure 11:
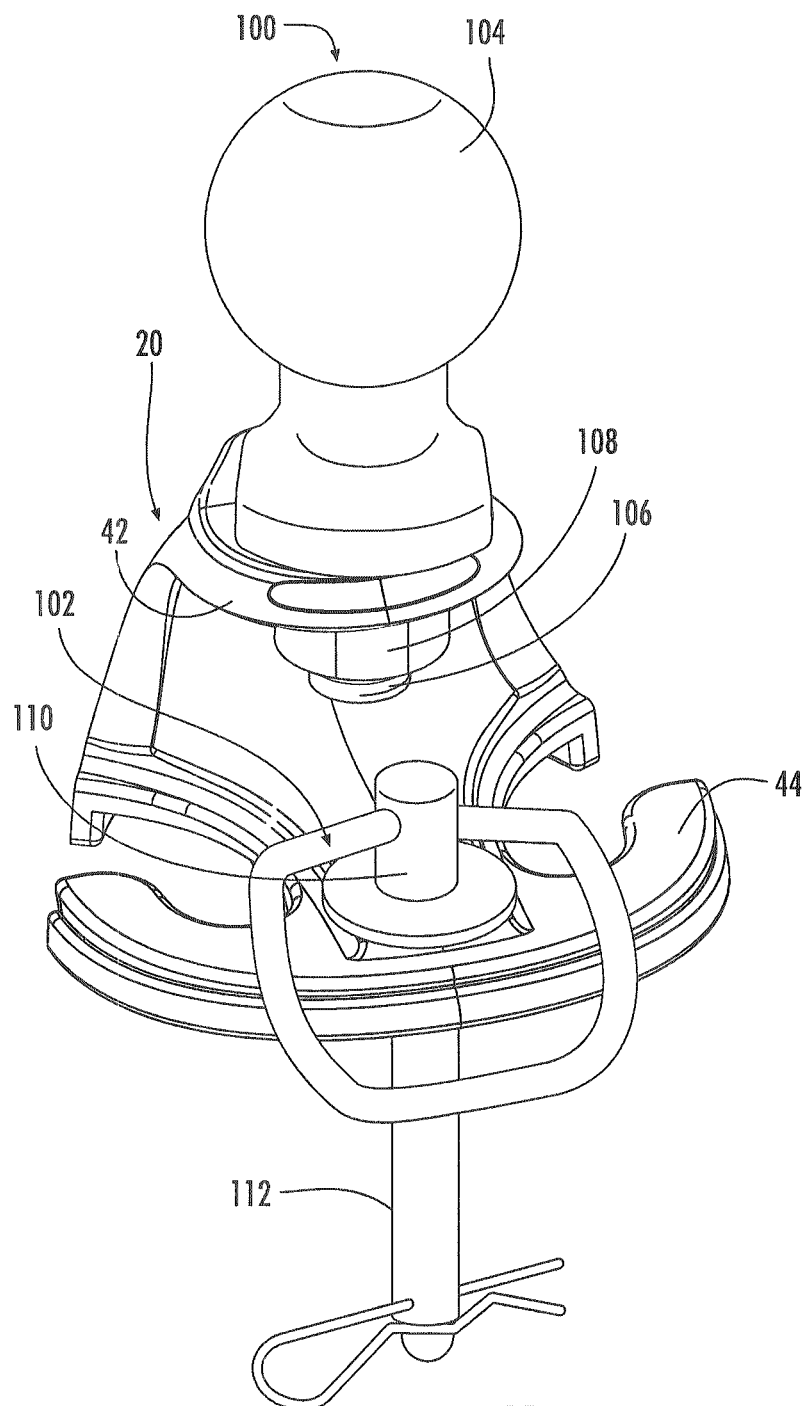
FIG. 11 is a perspective view of the hitch of FIG. 1 supporting a ball and a hitch pin.
Figure 12:
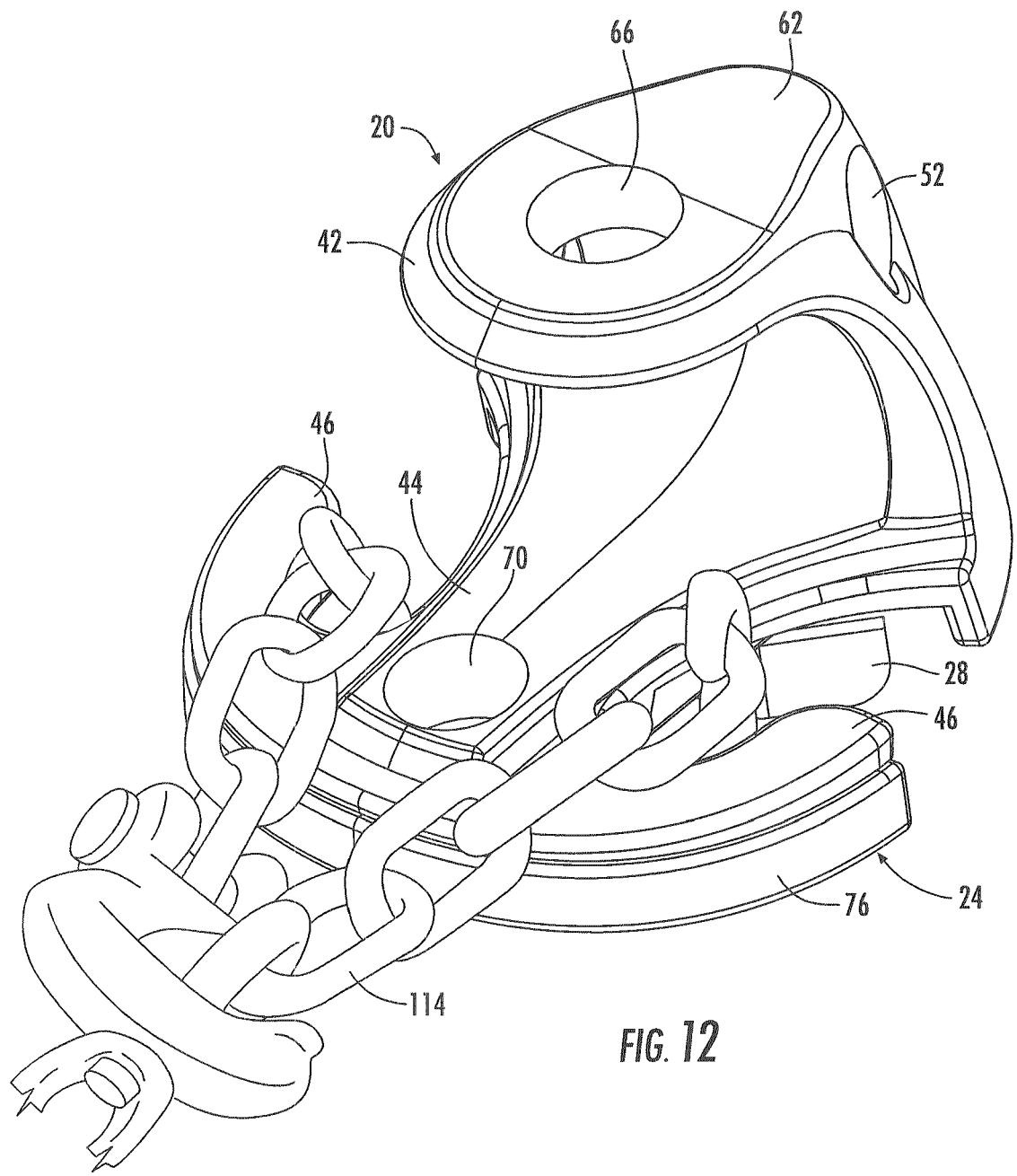
FIG. 12 is a perspective view of the hitch of FIG. 1 connected to a chain.

FIGS. 11 and 12 illustrate various uses of hitch 20. FIG. 11 illustrates a ball hitch 100 and a pin 102 connected to hitch 20. Ball hitch includes a ball 104 having a threaded shaft 106 downwardly extending through opening 66 (shown in FIG. 8) and retained in place by a nut 108 threaded onto shaft 106 and contained within cavity 68 (shown in FIG. 6). Nut 108 secures ball 104 on hitch 20. In other embodiments, ball 104 may be joined to hitch 20 in other fashions. In some embodiments, ball 104 may be welded to, bonded to or integrally formed as part of a single unitary body with body 22 or with limb 42.

Pin 102 includes a head 110 resting upon limb 44 and a downwardly extending shaft 112 extending through opening 70 and through one or more openings of a tongue 54. In applications where ball hitch 100 is used to connect an implement or load, pin 102 may be removed or omitted. Likewise, in circumstances where pin 102 is used to connect to an implement or load, ball hitch 100 may be removed.

FIG. 12 illustrates a chain 114 secured to a load or implement (not shown) and connected to hitch 20. As shown by FIG. 12, in one embodiment, a chain 114 is wrapped about limb 44 with portions of chain 110 received and retained within hooks 46. In other instances, chain 110 may be connected to one or both of hooks 46 in other fashions. In other instances, a cable, rope or other elongate flexible member may be used in place of chain 114.

Figure 13:
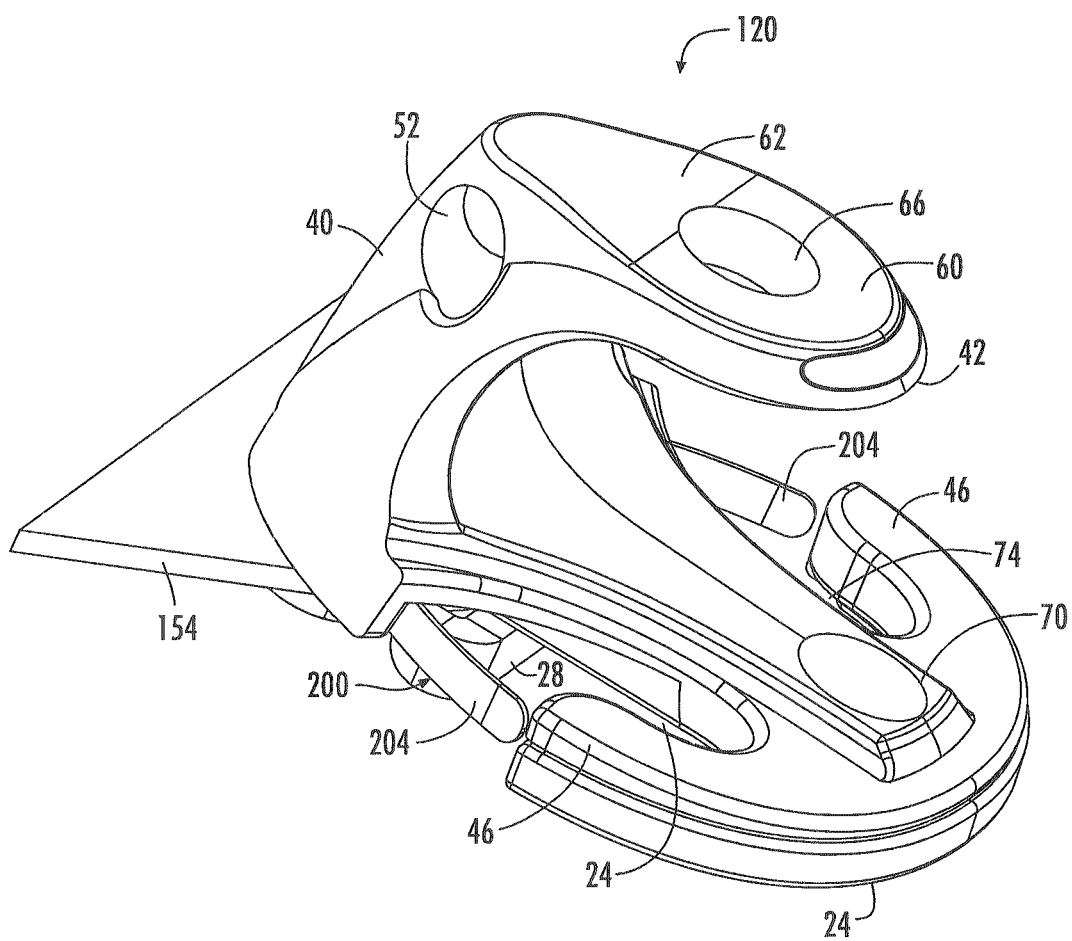
FIG. 13 is a top perspective view of another embodiment of the hitch of FIG. 1 connected to a vehicle tongue.
Figure 14:
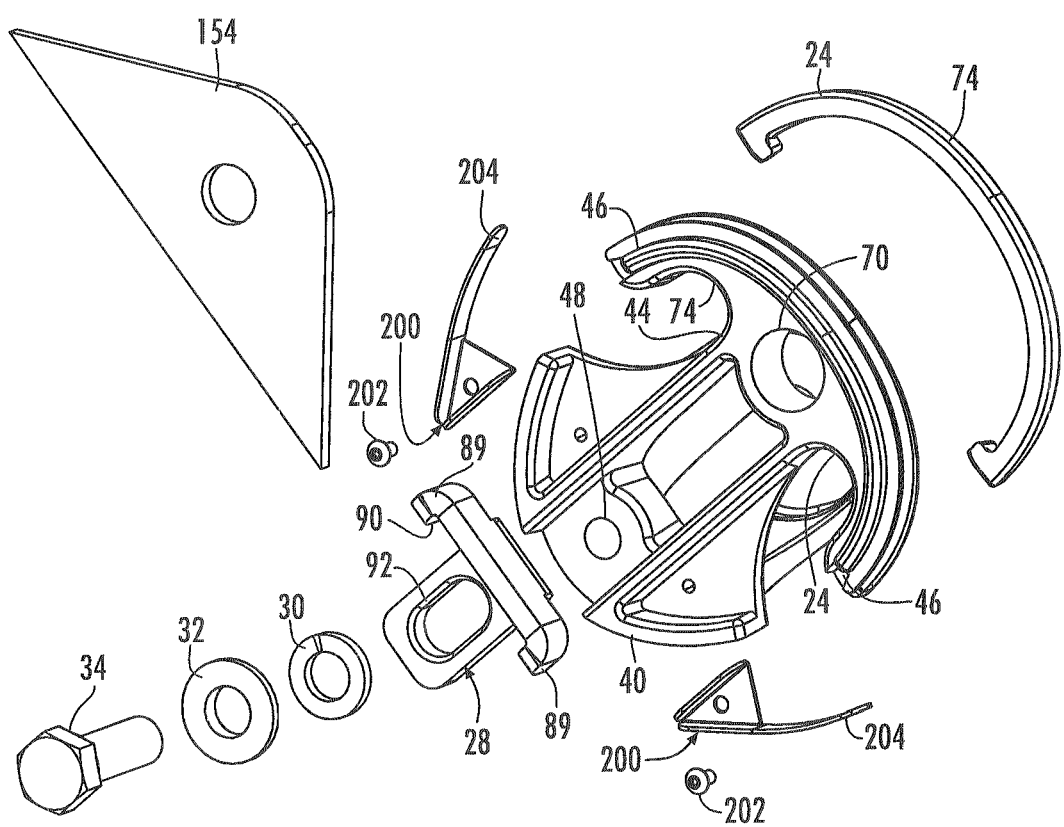
FIG. 14 is an exploded bottom perspective view of the hitch of FIG. 13.
Figure 15:
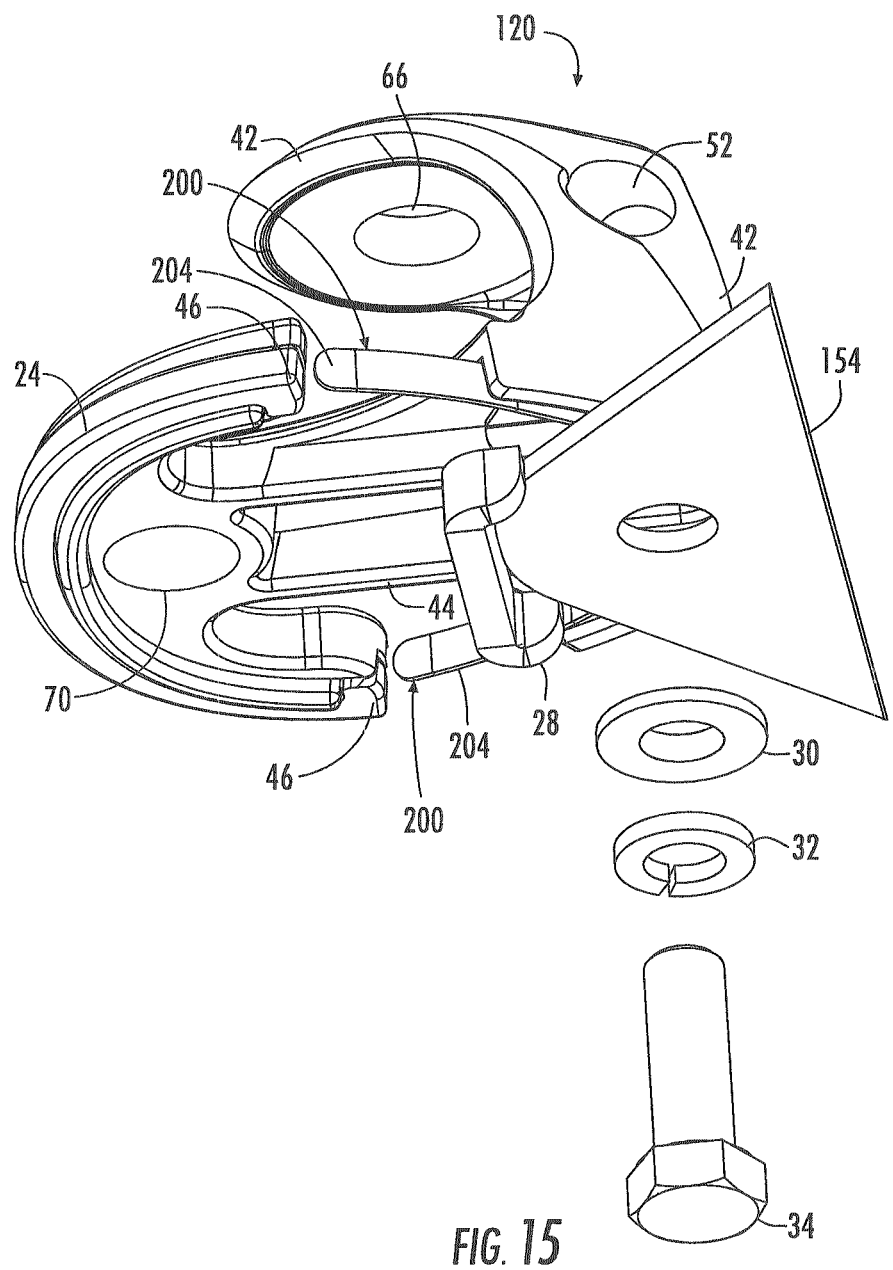
FIG. 15 is a bottom perspective view of the hitch of FIG. 12 positioned adjacent a vehicle tongue.

FIGS. 13-15 illustrate hitch 120, another embodiment of hitch 20 mounted to vehicle tongue 154'. Hitch 120 is similar to hitch 20 except that hitch 120 additionally includes retainers 200. Those remaining components of hitch 120 which correspond to components of hitch 20 are numbered similarly.

Retainers 200 each comprise one or more structures configured to retain a connection member within the corresponding notch 74 of the corresponding hook 46. For example, each of retainers 200 is configured to retain a hook, a chain, cable, rope or other elongate flexible member within the associated notch 74 of the corresponding hook 46. In the example illustrated, each retainer 200 is movable between a hook closing position in which notch 74 is open on one side and a hook closing position in which notch 74 is substantially surrounded. According to one embodiment, each retainer 200 is resiliently biased towards the hook closing position.

In the example illustrated, each of retainers 200 is fastened to an underside of body 22 by fasteners 202 and includes an elongate resiliently flexible finger 204. In one embodiment, each finger 204 is formed from resiliently flexible steel. In other embodiments, each finger may be formed from a resiliently flexible polymeric material or other material. In its other embodiments, each finger may be rigid or may be flexible, wherein a separate spring resiliently biases each finger 204 towards the hook closing position. In other embodiments, retainers 200 may be joined to body 22 in other fashions or may be integrally formed as part of a single unitary body with body 22. In still other embodiments, retainers 200 may be omitted.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A hitch comprising:
  a vertically extending trunk portion having a vertically extending hitch mounting structure extending vertically into or vertically from a base of the vertically extending trunk portion, the vertically extending hitch mounting structure being configured to be aligned with a vertical pin hole of a tongue of a mounting portion of a vehicle with the vertically extending trunk portion overlying the vertical pin hole;
  a first limb horizontally extending from the trunk portion and including a first opening configured to receive a fastener secured to a ball;
  a second limb horizontally extending from the trunk portion below the first limb and including a second opening horizontally beyond the first opening, the second opening configured to receive a pin; and
  a third opening extending through the trunk and configured to receive the pin.

2. The hitch of claim 1 further comprising a first hook extending from a first side of the second limb and a second hook extending from a second side of the second limb, wherein the first hook and the second hook are integrally formed as a single unitary body with the second limb and extend rearward of the second opening in a horizontal plane.

3. The hitch of claim 2 further comprising a first retainer movable between a first hook closing position and a first hook opening position.

4. The hitch of claim 3, wherein the first retainer is a resiliently biased towards the first hook closing position.

5. The hitch of claim 4 further comprising a second retainer movable between a second hook closing position and a second hook opening position, wherein the second retainer is a resiliently biased towards the second hook closing position.

6. The hitch of claim 1, wherein the second opening and the third opening have a same diameter.

7. The hitch of claim 1, wherein the third opening is vertically between the first opening and the second opening.

8. The hitch of claim 1, wherein the third opening is on one side of both the first opening and the second opening.

9. The hitch of claim 1, wherein the trunk has portions adjacent the third opening formed from a first material and wherein the hitch further comprises a pin gripping surface extending into the third opening and formed from a second material different than the first material.

10. The hitch of claim 1 further comprising a pin gripping surface resiliently biased into the third opening.

11. The hitch of claim 1 further comprising an arcuate bumper arcuately extending in a horizontal plane about an end of the second limb.

12. The hitch of claim 1 further providing a ball upwardly extending from the first limb.

13. The hitch of claim 1 further comprising an anti-rotation member configured to abut an edge of a vehicle tongue.

14. The hitch of claim 13, wherein the anti-rotation member is translatable relative to the trunk.

15. The hitch of claim 1, wherein the vertically extending hitch mounting structure comprises a vertically extending bore within the trunk portion and configured to receive a fastener extending through the pin hole and wherein the third opening overlies the vertically extending bore and extends below the first opening.

16. The hitch of claim 15, wherein the bore is internally threaded.

17. The hitch of claim 15, wherein the bore is blind.

18. A hitch comprising:
a vertically extending trunk portion having a vertically extending hitch mounting structure extending vertically into or vertically from a base of the vertically extending trunk portion, the vertically extending hitch mounting structure being configured to be aligned with a vertical pin hole of a tongue of a mounting portion of a vehicle with the vertically extending trunk portion overlying the vertical pin hole;
a first limb horizontally extending from the trunk portion;
a ball extending operably from an end of the first limb;
a second limb horizontally extending from the trunk portion below the first limb and including an opening horizontally beyond the ball, the opening configured to receive a pin, wherein the first limb is cantilevered above the second limb; and
a third opening extending horizontally through the trunk and configured to receive the pin, wherein the third opening is vertically between the first opening and the second opening.

19. The hitch of claim 18 further comprising a first hook extending from a first side of the second limb and a second hook extending from a second side of the second limb, wherein the first hook and the second hook are integrally formed as a single unitary body with the second limb and extend rearward of the second opening in a horizontal plane.

20. The hitch of claim 18 further comprising an arcuate bumper arcuately extending in a horizontal plane about an end of the second limb.

21. A hitch comprising:
a vertically extending trunk;
a first limb horizontally extending from the trunk portion and including a first opening configured to receive a fastener secured to a ball;
a second limb horizontally extending from the trunk portion below the first limb and including a second opening horizontally beyond the first opening, the second opening configured to receive a pin, wherein the first limb is cantilevered from the trunk above the second limb;
a third opening extending through the trunk and configured to receive the pin; and
a blind bore extending vertically upward into the trunk to mount the hitch to a vehicle tongue.

22. The hitch of claim 21, wherein the second opening and the third opening have a same diameter.

23. The hitch of claim 21, wherein the third opening is above the second opening.

24. The hitch of claim 21, wherein the third opening is on one side of both the first opening and the second opening.

25. The hitch of claim 21, wherein the trunk has portions adjacent the third opening formed from a first material and wherein the hitch further comprises a pin gripping surface extending into the third opening and formed from a second material different than the first material.

26. The hitch of claim 21 further comprising a pin gripping surface resiliently biased into the third opening.

27. The hitch of claim 21 further comprising a first hook extending from a first side of the second limb and a second hook extending from a second side of the second limb, wherein the first hook and the second hook are integrally formed as a single unitary body with the second limb and extend rearward of the second opening in a horizontal plane.

28. A hitch comprising:
a vertically extending trunk portion having a vertically extending hitch mounting structure extending vertically into or vertically from a base of the vertically extending trunk portion, the vertically extending hitch mounting structure being configured to be aligned with a vertical pin hole of a tongue of a mounting portion of a vehicle with the vertically extending trunk portion overlying the vertical pin hole;
a first limb horizontally extending from the trunk portion and including a first opening configured to receive a fastener secured to a ball;
a second limb horizontally extending from the trunk portion below the first limb and including a second opening horizontally beyond the first opening, the second opening configured to receive a pin;
a first hook extending from a first side of the second limb and a second hook extending from a second side of the second limb;
a third opening extending through the trunk and configured to receive the pin; and
an anti-rotation cavity configured to receive a vehicle tongue or an anti-rotation plate that abuts a vehicle.

29. A hitch comprising:
a vertically extending trunk portion having a vertically extending hitch mounting structure configured to be aligned with a vertical pin hole of a mounting portion of a vehicle;
a first limb horizontally extending from the trunk portion and including a first opening configured to receive a fastener secured to a ball; and
a second limb horizontally extending from the trunk portion below the first limb and including a second opening horizontally beyond the first opening, the second opening configured to receive a pin, wherein the vertically extending hitch mounting structure comprises a vertically extending bore within the trunk portion and configured to receive a fastener extending through the pin hole, wherein the bore is blind.

30. A hitch comprising:
- a vertically extending trunk portion having a vertically extending hitch mounting structure extending vertically into or vertically from a base of the vertically extending trunk portion, the vertically extending hitch mounting structure being configured to be aligned with a vertical pin hole of a tongue of a mounting portion of a vehicle with the vertically extending trunk portion overlying the vertical pin hole;
- a first limb horizontally extending from the trunk portion and including a first opening configured to receive a fastener secured to a ball;
- a second limb horizontally extending from the trunk portion below the first limb and including a second opening horizontally beyond the first opening, the second opening configured to receive a pin; and
- first hook extending from a first side of the second limb and a second hook extending from a second side of the second limb, wherein the first hook and the second hook are integrally formed as a single unitary body with the second limb and extend rearward of the second opening in a horizontal plane.

31. The hitch of claim 30 further comprising a retainer movable between a first hook closing position and a first hook opening position, the retainer being resiliently biased towards the first hook closing position.

\* \* \* \* \*